United States Patent [19]

Siegel et al.

[11] Patent Number: 6,117,224
[45] Date of Patent: Sep. 12, 2000

[54] DYE PREPARATIONS

[75] Inventors: Bernd Siegel, Otterstadt; Uwe Halder, Hassloch; Manfred Herrmann, Ludwigshafen; Herbert Leiter, Maxdorf, all of Germany

[73] Assignee: BASF Aktiengesellschaft, Ludwigshafen, Germany

[21] Appl. No.: 09/147,329

[22] PCT Filed: May 28, 1997

[86] PCT No.: PCT/EP97/02759

§ 371 Date: Dec. 3, 1998

§ 102(e) Date: Dec. 3, 1998

[87] PCT Pub. No.: WO97/46623

PCT Pub. Date: Dec. 11, 1997

[30] Foreign Application Priority Data

Jun. 5, 1996 [DE] Germany .......................... 196 22 485
Nov. 18, 1996 [DE] Germany .......................... 196 47 600
Dec. 4, 1996 [DE] Germany .......................... 196 50 251

[51] Int. Cl.$^7$ .................................................. C09D 11/02
[52] U.S. Cl. ..................................... 106/31.43; 106/31.47
[58] Field of Search ............................. 106/31.43, 31.47; 8/557, 589, 594

[56] References Cited

U.S. PATENT DOCUMENTS

| 3,660,008 | 5/1972 | Kissa | 8/557 |
| 3,765,835 | 10/1973 | Clarke et al. | 106/31.43 |
| 4,110,073 | 8/1978 | Mollet et al. | 8/557 |
| 4,427,413 | 1/1984 | Bauerle | 8/471 |
| 5,186,846 | 2/1993 | Brueckmann et al. | 8/557 |

FOREIGN PATENT DOCUMENTS

| 0 083 553 | 7/1983 | European Pat. Off. . |
| 0 463 401 | 1/1992 | European Pat. Off. . |
| 0 655 527 | 5/1995 | European Pat. Off. . |
| 29 47 005 | 11/1979 | Germany . |
| 62-011780 | 1/1987 | Japan . |
| 5-255626 | 10/1993 | Japan . |
| 1 527 396 | 10/1978 | United Kingdom . |

OTHER PUBLICATIONS

The Chemistry of Synthetic Dyes, vol. III, pp. 391 to 413, Academic Press, New York, London, 1970, no month.
Ullmann's Encyclopedia of Industrial Chemistry, VCH Verlagsgesellschaft mbH, Weinheim, 1985, vol. A1, pp. 107 to 112, no month.
Text. Chem. Color 19, (1987), No. 8, 23–29, no month.
Text. Chem. Color 21, 1989, No. 6, 27–32, no month.
Ullmann's Encyclopedia of Industrial Chemistry, 5$^{th}$ Edition, vol. A26, pp. 499 to 501, no date avail.
Chemical Abstracts, vol. 106, No. 10, Mar. 9, 1987, & JP 61 148 275 A (Mitsubishi Chemical Industries Co.) Jul. 5, 1986.

*Primary Examiner*—Helene Klemanski
*Attorney, Agent, or Firm*—Oblon, Spivak, McClelland, Maier & Neustadt, P.C.

[57] ABSTRACT

Dye compositions useful as inks for the inkjet and sublimation transfer printing processes comprise, based on the weight of the composition, from 0.1 to 30 wt % of one or more dyes selected from the class of the anthraquinones or quinophthalones which are free from ionic groups, from 0.1 to 20 wt % of a dispersant based on an arylsulfonic acid-formaldehyde condensation product and, optionally, water.

6 Claims, No Drawings

DYE PREPARATIONS

The present invention relates to novel dye compositions comprising, based on the weight of the composition, from 0.1 to 30 wt % of one or more dyes selected from the class of the anthraquinones or quinophthalones which are free from ionic groups, from 0.1 to 20 wt % of a dispersant based on an arylsulfonic acid-formaldehyde condensation product and, optionally, water, and to their use as inks in the inkjet and sublimation transfer printing processes.

EP-A 655,527 discloses dye compositions comprising disperse dyes and specific dispersants.

It is an object of the present invention to provide novel dye compositions comprising anthraquinone or quinophthalone dyes which are free from ionic groups. The novel dye compositions are to be suitable for improved use in the inkjet process and also in the sublimation transfer printing process.

Accordingly, we have found the dye compositions defined above.

Suitable anthraquinone dyes free from ionic groups conform for example to formula I

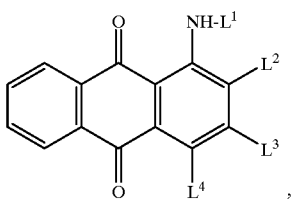

(I)

in which $L^1$ denotes hydrogen, $C_1$–$C_{10}$ alkyl or phenyl optionally substituted by $C_1$–$C_4$ alkyl, $C_1$–$C_4$ alkoxy, halogen or nitro, $L^2$ and $L^3$ independently denote hydrogen, $C_1$–$C_{10}$ alkoxy optionally substituted by phenyl or $C_1$–$C_4$ alkylphenyl; $C_1$–$C_{10}$ alkylthio optionally substituted by phenyl; halogen; cyano; hydroxyphenyl; $C_1$–$C_4$ alkoxyphenyl; $C_1$–$C_6$ alkanoyl; $C_1$–$C_6$ alkoxycarbonyl or a radical of the formula

in which $G^1$ denotes oxygen or sulfur and $G^2$ denotes hydrogen or mono-($C_1$–$C_8$ alkyl)sulfamoyl whose alkyl chain may be interrupted by 1 or 2 oxygen atoms in ether function, and $L^4$ denotes amino optionally substituted by $C_1$–$C_4$ alkyl, phenyl or $C_1$–$C_4$ alkylphenyl; hydroxyl; or $C_1$–$C_{10}$ alkylthio optionally substituted by phenyl.

Suitable quinophthalone dyes free from ionic groups conform for example to formula II

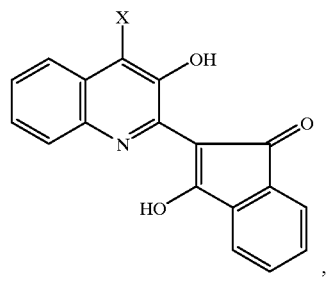

(II)

in which X denotes hydrogen, chlorine or bromine.

Any alkyl appearing in the above formula I may be linear or branched.

In any substituted alkyl appearing in the above formula I the number of substituents is usually 1 or 2.

In any substituted phenyl appearing in the above formulas the number of substituents is generally from 1 to 3, preferably 1 or 2.

The following is an exemplary list of radicals as defined in formula I.

Alkyl is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, 5th Edition, Vol. A 1, pages 290 to 293, and also Vol. A 10, pages 284 and 285).

Phenyl is for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4-or 2,6-dimethoxyphenyl, 2-, 3- or 4-fluorophenyl, 2-, 3- or 4-chlorophenyl, 2-, 3- or 4-bromophenyl or 2-, 3- or 4-nitrophenyl.

Alkylthio and phenylthio are for example methylthio, ethylthio, propylthio, isopropylthio, butylthio, isobutylthio, pentylthio, hexylthio, heptylthio, octylthio, isooctylthio, 2-ethylhexylthio, nonylthio, isononylthio, decylthio, isodecylthio, benzylthio or 1- or 2-phenylethylthio.

Alkoxy is for example methoxy, ethoxy, propoxy, isopropoxy, butoxy, isobutoxy, sec-butoxy, pentyloxy, isopentyloxy, neopentyloxy, tert-pentyloxy, hexyloxy, 2-methylpentyloxy, heptyloxy, octyloxy, isooctyloxy, 2-ethylhexyloxy, nonyloxy, isononyloxy, decyloxy, isodecyloxy, benzyloxy or 1- or 2-phenylethoxy.

Halogen is for example fluorine, chlorine or bromine.

Alkoxycarbonyl is for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl or hexyloxycarbonyl.

Alkanoyl is for example formyl, acetyl, propionyl, butyryl, pentanoyl or hexanoyl.

Sulfamoyl is for example methylsulfamoyl, ethylsulfamoyl, propylsulfamoyl, isopropylsulfamoyl, butylsulfamoyl, pentylsulfamoyl, hexylsulfamoyl, heptylsulfamoyl, octylsulfamoyl, 2-ethylsulfamoyl, 2-methoxyethylsulfamoyl, 2-ethoxyethylsulfamoyl, 3,6-dioxaheptylsulfamoyl, 3,6-dioxaoctylsulfamoyl, 4,8-dioxanonylsulfamoyl, 3,7-dioxaoctylsulfamoyl, 3,7-dioxanonylsulfamoyl, 4,7-dioxaoctylsulfamoyl, 4,7-dioxanonylsulfamoyl or 4,8-dioxadecylsulfamoyl.

Preference is given to dye compositions comprising one or more anthraquinone dyes of formula I in which $L^1$ denotes hydrogen, $C_1$–$C_4$ alkyl or phenyl or methyl-substituted phenyl and $L^4$ denotes hydroxyl, amino, $C_1$–$C_4$ alkylamino, or phenylamino optionally substituted by methyl.

Preference is further given to dye compositions comrising one or more anthraquinone dyes of formula I in which $L^2$ is $C_1$–$C_4$ alkoxy, cyano, acetyl, $C_1$–$C_4$ alkoxycarbonyl or a radical of the formula

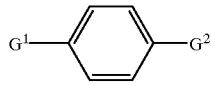

in which $G^1$ and $G^2$ are as defined above, with $G^1$ being in particular oxygen and $G^2$ in particular hydrogen.

Preference is also given to dye compositions containing one or more anthaquinone dyes of formula I in which $L^3$ denotes hydrogen.

Preference is further given to dye compositions containing the quinophthalone dye of formula IIa

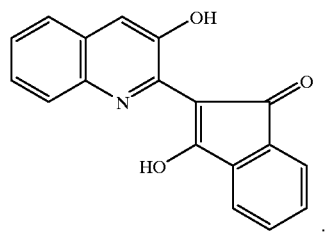

(IIa)

The dyes of formulas I and II are generally known dyes. The anthraquinone dyes of formula I are described for example in K. Venkataraman, The Chemistry of Synthetic Dyes, Vol. III, pages 391 to 413, Academic Press, New York, London, 1970. The quinophthalone dyes of formula II are described for example in EP-A 83,553 or the literature cited therein.

Preference is given to dye compositions in which 99% of the dye particles are smaller than 1 µm.

Preference is further given to dye compositions containing dyes of the anthraquinone or quinophthalone series whose sublimation temperature ranges from 140 to 300° C.

Preferably the dispersant used is an arylsulfonic acid-formaldehyde condensation product having a content of from 3 to 50 wt %, based on the weight of the dispersant, of one or more aromatic or long-chain aliphatic carboxylic acids, salts or anhydrides thereof, or a mixture of said compounds.

The arylsulfonic acid-formaldehyde condensates used are in particular those having a maximum sulfonic acid group content of 40 wt %.

A particularly suitable starting material for the preparation of the arylsulfonic acids is a mixture of aromatic compounds as obtained by thermal cracking of a naphthenic residual oil and fractionation of the breakdown products. Naphthenic residual oils are obtained for example when light gasoline is cracked. In DE-A 2,947,005, for example, they are referred to as high-boiling aromatic hydrocarbon oils. The naphthenic residual oil is preferably thermally cracked at from 1400 to 1700° C. The breakdown products are then subjected to fractional distillation. The overheads obtained under atmospheric pressure (1013 mbar) at 100–120° C. are collected and used as the aromatic compound for sulfonation. Such a fraction is usually obtained as a by-product in the known acetylene oil quench process (Ullmann's Encyclopedia of Industrial Chemistry, VCH Verlagsgesellschaft mbH, Weinheim, 1985, Volume A1, pages 107 to 112).

This aromatics fraction consists of a mixture of a number of aromatic substances, the structure and quantity of which cannot, in practice, be determined precisely. The following aryl compounds are the chief representatives present in said aromatics fraction:

|  | wt % in aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction additionally includes, as identified constituents, amounts of from 0.1 to about 2 wt % of the following aryl compounds: fluorene, indan, methylstyrene, phenanthrene, methylindan, dimethylnaphthalene, ethylnaphthalene, xylenes, tetrahydronaphthalene, styrene, methylethylbenzene, anthracene, fluoranthrene, pyrene, acenaphthylene and toluene.

Particularly suitable arylsulfonic acids generally contain α- and β-naphthalenesulfonic acids in a ratio of the α- to β-isomers of from 20:1 to 1:8, in particular from 10:1 to 1:5.

Examples of suitable aromatic carboxylic acids or derivatives thereof are naphthalenecarboxylic acid, naphthalic acid, terephthalic acid, isophthalic acid, benzoic acid, trimellitic acid, phenylacetic acid, phenoxyacetic acid, salicylic acid, p-hydroxy-benzoic acid, diphenylacetic acid, m-hydroxybenzoic acid, benzenetetraoic acid or acid anhydrides such as phthalic anhydride, trimellitic anhydride, benzene-1,2,4,5-tetraoic dianhydride or naphthalic anhydride.

Particularly suitable long-chain aliphatic carboxylic acids are saturated or olefinically unsaturated, linear or branched aliphatic monocarboxylic acids of natural or synthetic origin and containing from 8 to 22, preferably from 8 to 18, carbon atoms, for example higher fatty acids such as caprylic acid, capric acid, lauric acid, myristic acid, palmitic acid, stearic acid, oleic acid, linoleic acid or linolenic acid, or synthetically produced carboxylic acids such as 2-ethylhexanoic acid, isononanoic acid or isotridecanoic acid.

Also of interest are mixtures of anhydrides, mixtures of carboxylic acids, mixtures of salts of said carboxylic acids and also mixtures of carboxylic acids and anhydrides. Suitable salts of said carboxylic acids are the alkali metal, ammonium or alkaline earth metal salts, for example those obtained by neutralization of said carboxylic acids with sodium hydroxide, potassium hydroxide, lithium hydroxide, sodium carbonate, magnesium carbonate, calcium oxide, calcium hydroxide, ammonia or alkanolamines such as ethanolamine, diethanolamine or triethanolamine.

Particular preference is given to the use, in the dispersants, of sodium benzoate, sodium phenylacetate, sodium salicylate, sodium 4-hydroxybenzoate, sodium terephthalate, sodium 2-hydroxy-3-naphthalene carboxylate, naphthalene-1-carboxylic acid, phthalic anhydride or benzoic acid.

The dispersants present in the dye compositions of the invention are preferably those comprising A) from 50 to 97 wt %, in particular from 70 to 95 wt %, of one or more arylsulfonic acid-formaldehyde condensates, and B) from 3 to 50 wt %, in particular from 5 to 30 wt %, of one or more aromatic or long-chain aliphatic carboxylic acids or salts or anhydrides thereof or a mixture of said compounds.

The arylsulfonic acid-formaldehyde condensation products used according to the invention as dispersants are products known per se. They are described for example in U.S. Pat. No. 5,186,846.

Preference is given to dye compositions comprising, based on the 45 weight of the composition, from 1 to 15 wt % of one or more dyes selected from the class of the anthraquinones or quinophthalones, from 0.5 to 10 wt % of a dispersant based on an arylsulfonic acid-formaldehyde condensation product and, optionally, water.

Preference is further given to dye compositions which additionally contain, based on the weight of the composition, from 0.1 to 30 wt %, preferably from 0.1 to 25 wt %, of a carbohydrate and from 0.1 to 20 wt %, preferably from 0.1 to 15 wt %, of a polyethylene glycol.

Suitable carbohydrates for inclusion in the dye compositions of the invention are for example sorbitol and glucose.

Suitable polyethylene glycols for inclusion in the dye compositions of the invention have an average molecular weight of, say, from 100 to 1000, preferably about 400.

Examples of other possible constituents of the dye compositions of the invention are auxiliaries such as preservatives, antioxidants, foam inhibitors or viscosity regulators. These agents are known per se and are commercially available. If these auxiliaries are present in the dye compositions of the invention, the overall concentration thereof is generally 1 wt % or less, based on the weight of the composition.

If the weights of the constituents of the dye compositions of the invention total less than 100 wt %, the remainder is generally water.

The dye compositions of the invention usually have a viscosity of from 1 to 4 mm$^2$/s, preferably from 2 to 3.5 mm$^2$/s.

The surface tension of the dye compositions of the invention usually ranges from 30 to 70 Nm/m, preferably from 40 to 60 Nm/m.

The pH of the dye compositions of the invention generally ranges from 5 to 11, preferably from 7 to 10.

The novel dye compositions are prepared in known manner. For instance, the dye, for example in the form of a press cake, can be admixed with the dispersant and, optionally, with polyethylene glycol in the presence of water and predispersed in suitable apparatus. The resulting mixture can then be milled to the desired dye particle size. Final adjustment can then be effected by the addition of appropriate amounts of water, optionally polyethylene glycol and/or carbohydrates and optionally further auxiliaries, followed by mixing and filtration through a sieve, preferably one having a pore size of 1 μm.

The dye compositions of the invention are particularly suitable for use as inks in the inkjet and sublimation transfer printing processes.

The inkjet printing process usually makes use of aqueous inks, which are sprayed as minute droplets directly onto the substrate. There is a continuous form of the process, in which the ink is forced through the nozzle at a uniform rate and the jet is directed onto the substrate by an electric field in accordance with the pattern to be printed; and there is an intermittent or drop-on-demand inkjet process, in which the ink is expelled only where a colored dot is to appear, the latter form of the process employing either a piezoelectric crystal or a heated hollow needle (bubble-jet or thermal jet process) to exert pressure on the ink system and so eject a droplet of ink. These techniques are described in Text. Chem. Color 19 (1987), No. 8, 23–29, and 21 (1989), No. 6, 27–32.

The dye compositions of the invention are particularly useful as inks for the bubble-jet process or for the process employing a piezoelectric crystal.

Substrates suitable for inkjet printing are paper and the substrates mentioned below.

In sublimation transfer printing, a pattern is initially preformed on a transfer area and is then transferred to a substrate under the action of heat. The dye can be fixed not only during the transfer process itself but also in a subsequent fixation and post-treatment operation. This process is well known and is described in Ullmann's Encyclopedia of Industrial Chemistry, 5th Edition, Volume A26, pages 499 to 501, for example.

Examples of particularly suitable substrates are textile materials such as fibers, yarns, threads, knits, wovens or nonwovens composed of polyester, modified polyester, for example anionic modified polyester, blend fabrics of polyester with cellulose, cotton, viscose or wool, polyamide, polyacrylonitrile, triacetate, acetate, polycarbonate, polypropylene or polyvinyl chloride, polyester microfibers or substrates coated with plastics materials, examples of such coated substrates being foils, glass or ceramics.

The dye compositions of the invention are particularly suitable for that form of sublimation transfer printing in which the pattern on the transfer area is produced by means of the inkjet process.

The novel dye compositions are notable for not causing clogging of the inkjet nozzles. Furthermore, the resulting printouts are not stripey in appearance.

The invention is illustrated by the following examples.

The following dyes were used:

Dye 1

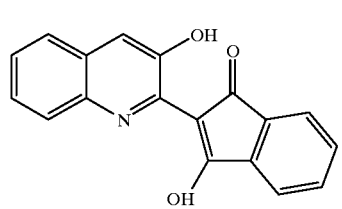

Dye 2

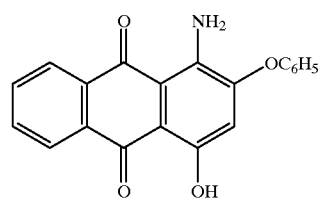

-continued

Dye 3

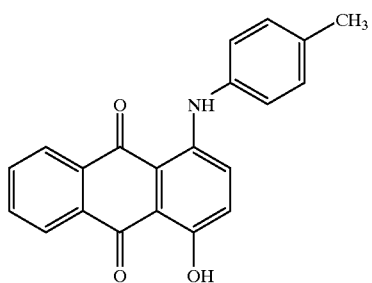

Dye 4

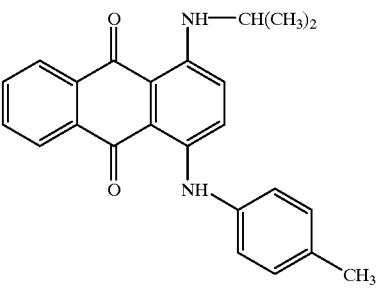

Preparation of the dye composition 15 g of dye, 15 g of polyethylene glycol (average molecular weight: 400), 7.5 g of a dispersant based on an arylsulfonic acid-formaldehyde condensation product and containing benzoic acid, as described as Dispersant 3 in U.S. Pat. No. 5,186,846, 0.37 g of a 50 wt % strength aqueous solution of glutaraldehyde and 0.75 g of 47 wt % strength aqueous solution of tetramethylolacetylene diurea are made up to a total weight of 100 g with water and ground to a paste in a mill. Thereafter the pH is adjusted to 8.5 with 10 wt % strength sodium hydroxide solution.

The mixture is then milled in a stirred ball mill such that 99% of the dye particles have a size of less than 1 μm.

For final adjustment, 26.7 g of mill base are admixed with a further 4 g of polyethylene glycol (see above), 0.1 g of 50 wt % strength aqueous solution of glutaraldehyde, 0.3 g of 47 wt % strength aqueous solution of tetramethylolacetylene diurea and 20 g of 70 wt % strength aqueous sorbitol solution, made up with water to a total weight of 100 g, mixed and filtered through a sieve having a pore size of 1 μm.

The following dye compositions were obtained (all percentages are by weight):

TABLE 1

| | Composition No. | | | |
|---|---|---|---|---|
| | 1 | 2 | 3 | 4 |
| Dye No. 1 | 4% | | | |
| Dye No. 2 | | 4% | | |
| Dye No. 3 | | | 4% | |
| Dye No. 4 | | | | 4% |
| Dispersant | 2% | 2% | 2% | 2% |
| Polyethylene glycol | 8% | 8% | 8% | 8% |
| 70% strength aqueous solution of sorbitol | 20% | 20% | 20% | 20% |
| 50% strength aqueous solution of glutaraldehyde | 0.5% | 0.5% | 0.5% | 0.5% |
| 4% strength aqueous solution of | 1.0% | 1.0% | 1.0% | 1.0% |

TABLE 1-continued

| | Composition No. | | | |
|---|---|---|---|---|
| | 1 | 2 | 3 | 4 |
| tetramethylolacetylene diurea | | | | |
| Demineralized water | 64.5% | 64.5% | 64.5% | 64.5% |
| Total | 100% | 100% | 100% | 100% |

B) The dye compositions have the following physical properties and printing characteristics:

TABLE 2

| | Composition No. | | | |
|---|---|---|---|---|
| | 1 | 2 | 3 | 4 |
| pH | 9.1 | 7.9 | 8.9 | 8.5 |
| Surface tension [mN/m] | 54.9 | 58.1 | 50.8 | 56.0 |
| Viscosity [mm$^2$/s] | 2.76 | 2.58 | 3.22 | 3.11 |
| Particle size distribution [μm] × 50 | 0.32 | 0.33 | 0.46 | 0.42 |
| Particle size distribution [μm] after aging a) × 50 | 0.55 | 0.32 | 0.45 | 0.37 |
| Particle size distribution [μm] after aging b) × 50 | 0.35 | 0.36 | 0.48 | 0.35 |
| Drop weight [ng] 10 million drops minimum/maximum | 94/101 | 93/110 | 85/95 | 80/105 |
| Dispersion factor | 99.4% | 100% | 99.5% | 99.2% |

Test methods and evaluations

1) Surface tension

The surface tension was measured using a Krüss K 10 digital tensiometer. The values given in Table 2 are the averages of 3 readings.

2) Viscosity

The viscosity was determined by the Ubbelohde method (DIN 51662).

3) pH

The pH was determined using a Knick 763 pH meter.

4) Particle size determination

The particle size distribution was measured using an Alcatel CILAS HR 850 granulometer.

5) Aging stability

The aging stability of the compositions (inks) was investigated by two methods:

a) by a heat stress test (hot storage of the inks at 60° C. for 3 days)

b) by a freeze-heat treatment (freezing for 4 hours at −20° C. followed by heat treatment at 70° C. for 4 hours). The inks were subjected to this freeze-heat cycle 4 times in each assay.

After each of the two aging tests, the particle size distribution of the aged inks was redetermined using the CILAS method.

6) Cogation test

The behavior of the inks in the nozzles during the printing process is of particular importance. The following test examined the tendency of the inks to form deposits and thus cause clogging of the nozzles.

A modified Desk Jet PLUS (bubble-jet printer), sold by Hewlett Packard, was used as test equipment.

First, the average drop weight was determined as a function of the voltage applied to the nozzles. Then 1 million pulses were sent to each nozzle at constant voltage and thereafter the average drop weight of a specific number of drops was redetermined. This operation was repeated a total of 10 times.

With an ideal ink, the average drop weight should remain constant over the test period.

The change in drop weight of the individual inks is shown in Table 2.

7) Dispersion factor 100 ml of each ink were stored for 7 days at room temperature in a graduated cylinder. Then 10 ml of the dispersion were removed from the bottom of the column of liquid and 10 ml from the top, and the color strength of each sample was determined photometrically.

The dispersion factor of the dispersion is calculated as the color strength of the top sample divided by the color strength of the bottom sample multiplied by 100.

C) Making inkjet prints on paper

Prints were made using a commercial inkjet printer (HP 500) as sold by Hewlett Packard and using the following commercially available papers:

a) Intercopy paper
b) Claire Fontaine paper
c) Premium Glossy paper sold by Hewlett Packard
d) Inkjet paper sold by Zweckform
e) Specially coated paper sold by Epson Printing tests were also carried out on a paper coated in the following manner:

Intercopy paper was first of all coated with a 10 wt % strength solution of polyvinyl alcohol in a 20:45:20 v/v mixture of toluene, methylethyl ketone and cyclohexane using a 12 μm doctor knife and then with a 5 wt % strength solution of ethylhydroxyethyl cellulose in an 8:2 v/v mixture of toluene and ethanol, again using a 12 μm doctor knife, and finally with a 5 wt % strength aqueous solution of carboxylmethylcellulose using a 24 μm doctor knife.

Prints were made using Compositions 1 to 4 diluted to twice their volume with water. Following a drying period of 24 h, the resulting prints showed good scuff resistance and good fastness to water and light.

When the prints are heated at 150° C. for a period of 30 s there is a distinct improvement in color strength and brilliance. This is accompanied by increased scuff resistance and better fastness to light and the dyeings are more level. These findings are particularly conspicuous on papers d) and e).

What is claimed is:

1. A process comprising applying to a substrate by inkjet a dye composition comprising, based on the weight of the composition, from 0.1 to 30 wt % of one or more dyes selected from the class of the anthraquinones or quinophthalones which are free from ionic groups, from 0.1 to 20 wt % of a dispersant based on an arylsulfonic acid-formaldehyde condensation product having a content of from 3 to 50 wt %, based on the weight of the dispersant, of one or more aromatic or long-chain aliphatic carboxylic acids or salts or anhydrides thereof, or a mixture of said compounds, and, optionally, water.

2. The method of claim 1, comprising, based on the weight of the composition, from 1 to 15 wt % of one or more dyes selected from the class of the anthraquinones or quinophthalones, from 0.5 to 10 wt % of a dispersant based on an arylsulfonic acid-formaldehyde condensation product and, optionally, water.

3. The method of claim 1, also containing, based on the weight of the composition, from 0.1 to 30 wt % of a carbohydrate and from 0.1 to 20 wt % of a polyethylene glycol.

4. The method of claim 1, wherein 99% of the dye particles are smaller than 1 μm.

5. A method of claim 1, containing anthraquinone dyes of formula I

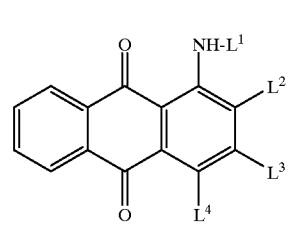

(I)

in which
L$^1$ denotes hydrogen; C$_1$–C$_{10}$ alkyl; or phenyl optionally substituted by C$_1$–C$_4$ alkyl, C$_1$–C$_4$ alkoxy, halogen or nitro,
L$^2$ and L$^3$ independently denote hydrogen; C$_1$–C$_{10}$ alkoxy optionally substituted by phenyl or C$_1$–C$_4$ alkylphenyl; C$_1$–C$_{10}$ alkylthio optionally substituted by phenyl; halogen; 0050/46981 cyano; hydroxyphenyl; C$_1$–C$_4$ alkoxyphenyl; C$_1$–C$_6$ alkanoyl; C$_1$–C$_6$ alkoxycarbonyl; or a radical of the formula

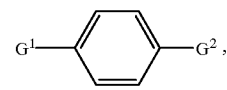

in which G$^1$ denotes oxygen or sulfur and G$^2$ denotes hydrogen or mono(C$_1$–C$_8$ alkyl)sulfamoyl whose alkyl chain is optionally interrupted by 1 or 2 oxygen atoms in ether function, and
L$^4$ denotes amino optionally substituted by C$_1$–C$_4$ alkyl, phenyl or C$_1$–C$_4$ alkylphenyl; hydroxyl; or C$_1$–C$_{10}$ alkylthio optionally substituted by phenyl.

6. The method of claim 1, containing a quinophthalone dye of formula II

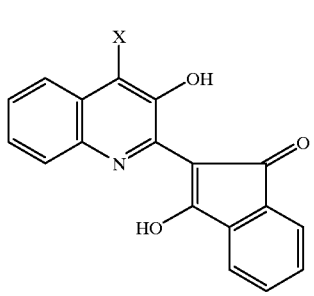

(II)

in which
X denotes hydrogen, chlorine or bromine.

* * * * *